(12) United States Patent
Mamo et al.

(10) Patent No.: US 10,994,661 B2
(45) Date of Patent: May 4, 2021

(54) CARGO MANAGEMENT DEVICE INTEGRATED WITH TRIM PANEL

(71) Applicant: Auria Solutions UK I, Ltd., London (GB)

(72) Inventors: Robert Mamo, Northville, MI (US); Brian Pour, Northville, MI (US); Ernest Franklin Wilson, Albemarle, NC (US); Michael Culleton, County Dublin (IE); Alan Harrison, County Mayo (IE); Ben Millett, County Roscommon (IE)

(73) Assignee: Auria Solutions UK I. Ltd., London (GB)

( * ) Notice: Subject to any disclaimer, the term of this patent is extended or adjusted under 35 U.S.C. 154(b) by 0 days.

(21) Appl. No.: 16/595,310

(22) Filed: Oct. 7, 2019

(65) Prior Publication Data

US 2020/0108778 A1 Apr. 9, 2020

Related U.S. Application Data

(60) Provisional application No. 62/840,801, filed on Apr. 30, 2019, provisional application No. 62/742,017, filed on Oct. 5, 2018.

(51) Int. Cl.
*B60R 7/08* (2006.01)
(52) U.S. Cl.
CPC ..................... *B60R 7/08* (2013.01)
(58) Field of Classification Search
CPC .. B60R 5/00; B60R 5/04; B60R 5/045; B60R 7/00; B60R 7/02; B60R 7/08; B60R 2011/0003; B60R 2011/0029; B60R 2011/0036; B60R 2011/0042; B60R 2011/005; B60R 2011/0063;
(Continued)

(56) References Cited

U.S. PATENT DOCUMENTS 5,340,183 A 8/1994 Horian
5,601,271 A 2/1997 Janowski et al.
(Continued)

FOREIGN PATENT DOCUMENTS

EP 2958772 B1 11/2018
RU 81139 U1 3/2009
(Continued)

OTHER PUBLICATIONS

International Search Report and Written Opinion dated May 17, 2018 in relation to corresponding International Application No. PCT/IB2018/051010.
(Continued)

*Primary Examiner* — Corey N Skurdal
(74) *Attorney, Agent, or Firm* — Steven J. Grossman; Grossman Tucker Perreault & Pfleger PLLC

(57) ABSTRACT

The present invention relates to a freestanding unit for securing items within the floor of a cargo area in a vehicle comprising a primary wall and at least one projecting wall extending from the primary wall which includes an anchoring component for anchoring the freestanding unit to the floor in the cargo area. The present invention also relates to a vehicular cargo management system that includes such freestanding unit where the trim panel includes a recess to accommodate the projecting wall of the freestanding unit which may then fit flush to the trim panel.

11 Claims, 25 Drawing Sheets

(58) Field of Classification Search
CPC ..... B60R 2011/0064; B60R 2011/0077; B60R 2011/008; B60P 7/08; B60P 7/0807; B60P 7/0884; B60P 7/0892; B60N 3/04; B60N 3/046; B60N 3/105; B65D 25/06; Y10S 224/925

See application file for complete search history.

(56) References Cited

U.S. PATENT DOCUMENTS

| | | |
|---|---|---|
| 6,357,088 B2 | 3/2002 | Provost et al. |
| 6,682,118 B2 | 1/2004 | Ryan |
| 7,217,074 B1 | 5/2007 | Huber |
| 7,306,416 B1 | 12/2007 | Arico |
| 9,067,521 B1 | 6/2015 | Masanek, Jr. et al. |
| 9,931,988 B2 | 4/2018 | Culleton et al. |
| 2001/0000233 A1 | 4/2001 | Bailey et al. |
| 2009/0080993 A1 | 3/2009 | Burgess |
| 2014/0054345 A1 | 2/2014 | Thom et al. |
| 2014/0246466 A1 | 9/2014 | Culleton et al. |
| 2016/0121803 A1 | 5/2016 | Masanek et al. |
| 2017/0158141 A1 | 6/2017 | Dhillon et al. |
| 2017/0190140 A1 | 7/2017 | Beck, Jr. et al. |

FOREIGN PATENT DOCUMENTS

| | | |
|---|---|---|
| WO | 199603293 A1 | 2/1996 |
| WO | 2014128633 A1 | 8/2014 |
| WO | 2018150389 A1 | 8/2018 |
| WO | 2018155780 A1 | 8/2018 |

OTHER PUBLICATIONS

Brochure Skoda Octavia, Germany, Simply Clever, and photographs of cargo organizers in a Skoda Superb Station Waggon, (Aug. 2019).

International Search Report and Written Opinion dated Dec. 30, 2019 in relation to corresponding International Application No. PCT/US2019/55059.

CARGO MANAGEMENT DEVICE INTEGRATED WITH TRIM PANEL

CROSS-REFERENCE TO RELATED APPLICATIONS

The present application claims the benefit of the filings date of U.S. Provisional Application 62/742,017 filed Oct. 5, 2018 and U.S. Provisional Application 62/840,801 filed Apr. 30, 2019, the teachings of which are incorporated by reference.

FIELD

The present disclosure relates to trim panels configured to integrate cargo management devices.

BACKGROUND

During transport cargo stored in the cargo area of a vehicle often shifts if the cargo is not secured in some manner. This may cause a degree of consternation among the passengers or drive, damage the cargo, damage the compartment or even cause injury to passengers if the cargo area is open to the remainder of the vehicle. Various cargo management devices have been used to prevent cargo shift, including nets, buckets, boxes, and trays of various shapes and sizes. One such device is a free-standing unit that props items against the side walls of the cargo area of the vehicle. Convenience often dictates that cargo management devices remain in the cargo area of the vehicle such that they are available whenever needed. However, they take up load floor area within the cargo compartment and may reduce the amount of storage available in the load floor area when not in use, potentially interfering with the placement of larger items in the vehicle. Accordingly, room for improvement remains in the development of cargo management devices and their storage.

SUMMARY

A freestanding unit for securing items within a floor of a cargo area in a vehicle comprising a primary wall and at least one projecting wall extending from said primary wall wherein said projecting wall includes an anchoring component for anchoring the freestanding unit to said floor in said cargo area. The anchoring component comprises a plurality of nibs wherein each of the nibs is tiered, including a frusto-conical base having an upper surface and a tip extending from the upper surface of the frusto-conical base wherein the tip includes a sidewall that meets the upper surface of the frusto-conical base where the tip has a diameter and the frusto-conical base has a diameter and the diameter of the tip is less than the diameter of the frusto-conical base. Each nib is located within a column or row and is offset from at least one other nib present in the column and at least one other nib present in the row.

The present invention also relates to a vehicular cargo management system again comprising a freestanding unit for securing items within a floor of a cargo area in a vehicle comprising a primary wall and at least one projecting wall extending from the primary wall wherein the projecting wall includes an anchoring component for anchoring said freestanding unit to said floor in said cargo area. The anchoring component again comprises a plurality of nibs wherein each of the nibs is tiered, including a frusto-conical base having an upper surface and a tip extending from said upper surface of the frusto-conical base wherein the tip includes a sidewall that meets the upper surface of the frusto-conical base where the tip has a diameter and the frusto-conical base has a diameter and the diameter of the tip is less than the diameter of the frusto-conical base. Each nib is again located within a column or row and is offset from at least one other nib present in the column and at least one other nib present in the row. The system further includes a recess in the trim panel to accommodate the projecting wall of the freestanding unit.

The present invention also relates to a freestanding unit for securing items within a floor of a cargo area in a vehicle comprising a primary wall and at least one projecting wall extending from the primary wall wherein the projecting wall includes an anchoring component for anchoring the freestanding unit to the floor in the cargo area. The anchoring component comprises a plurality of protrusions and the unit also includes a plurality of slider ribs on the projecting wall.

BRIEF DESCRIPTION OF THE DRAWINGS

The above-mentioned and other features of this disclosure, and the manner of attaining them, will become more apparent and better understood by reference to the following description of embodiments described herein taken in conjunction with the accompanying drawings, wherein.

DETAILED DESCRIPTION

The present disclosure relates to trim panels configured to integrate cargo management devices for storage. Cargo management devices may be understood as devices that prevent or reduce the shifting of cargo placed in a storage compartment, including the cargo compartment or trunk of a vehicle. In particular, the present disclosure is directed to the integration of cargo management devices that include a primary wall and at least one projection extending from the primary wall, preferably from the base of the primary wall. The cargo management device may be inserted into a recess in a trim panel of the cargo area or elsewhere retaining the cargo management device in place. In a particular embodiment, the cargo management device is a free-standing unit that props items against the side wall of the cargo area available from Stayhold, Dublin, Ireland, described in U.S. Pat. No. 9,931,988, entitled "Device for Securing Items in a Cargo Area of a Car" and granted on Apr. 3, 2018, the teachings of which are incorporated herein by reference. Further, while the embodiments below are directed to side trim panels, it may be appreciated that the recess for the cargo management device may alternatively be provided on other trim panel components such as gates, trunk lids, doors, or seat backs.

Figure 1:
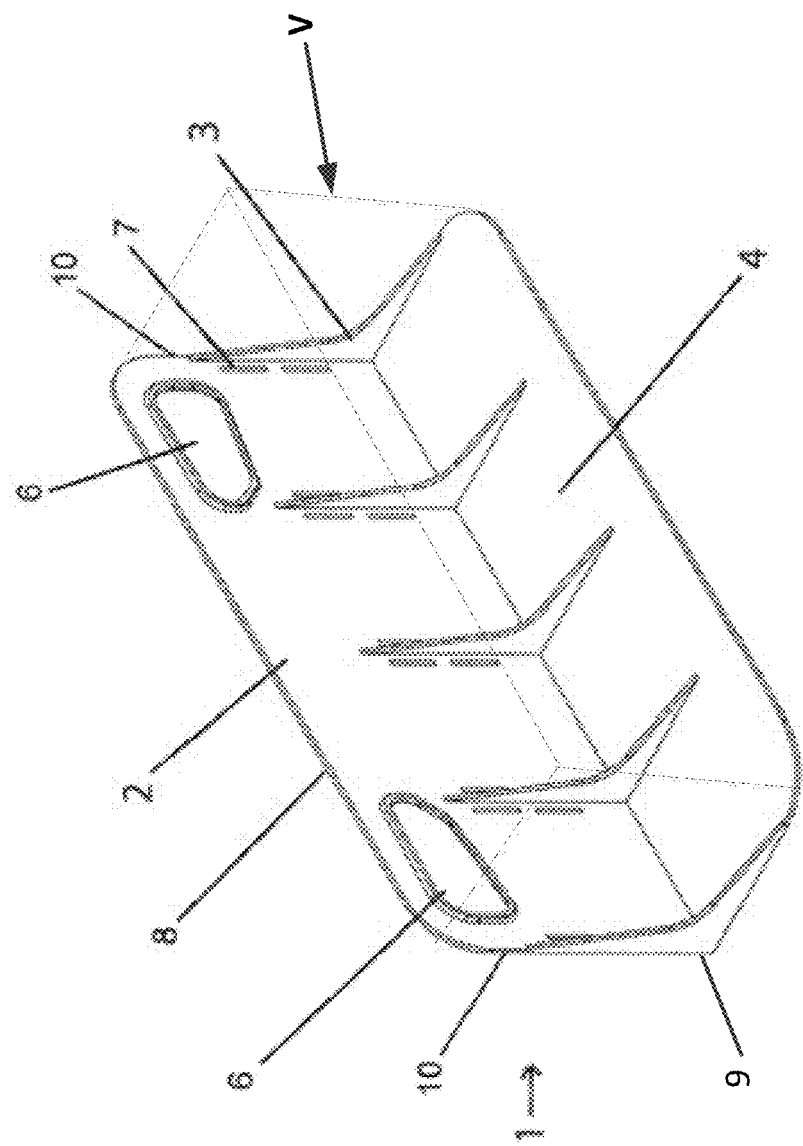
FIG. 1 illustrates an embodiment of a cargo management device.
Figure 2:
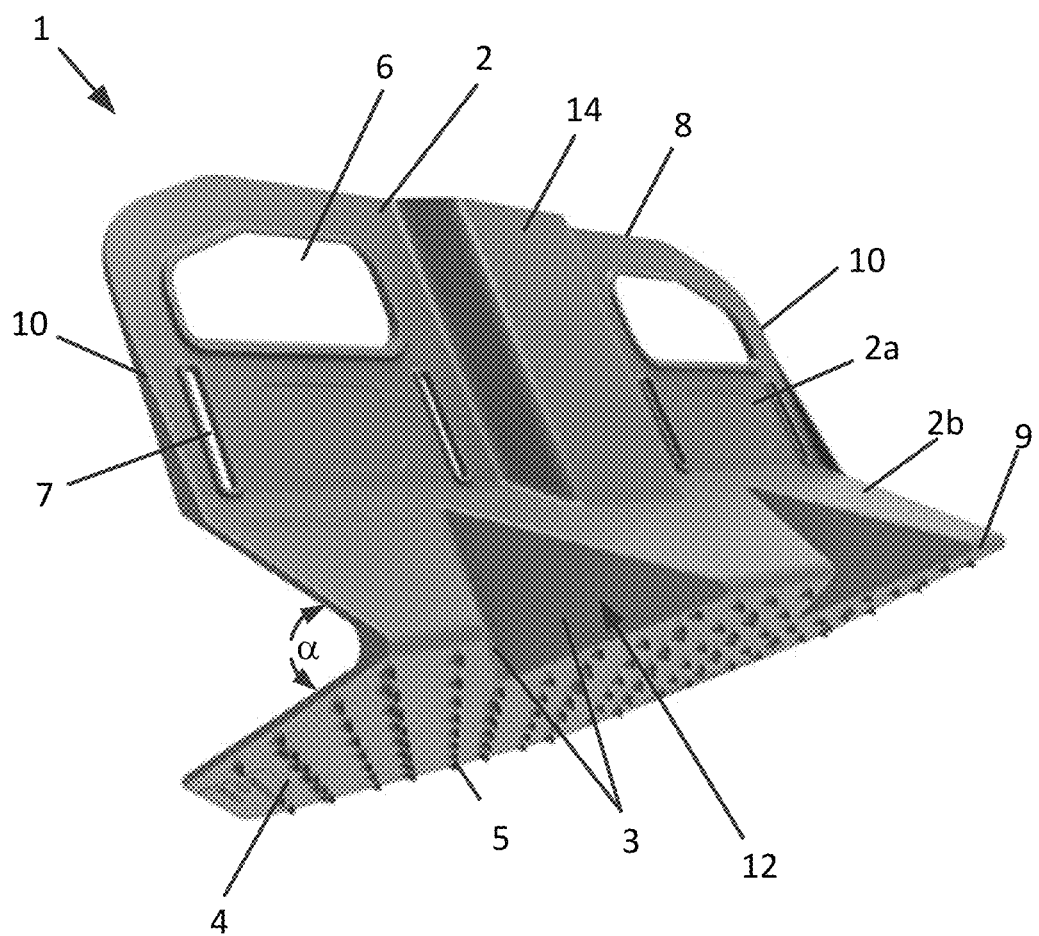
FIG. 2 illustrates another embodiment of a cargo management device.

As illustrated in FIG. 1, the free-standing cargo management device 1 generally includes a generally vertically disposed primary wall 2 and at least one generally horizontally disposed projecting wall 4 extending from the primary wall. In particularly preferred embodiments the projecting wall 4 is a ground wall, which projects from the base of the primary wall. The primary wall 2 and projecting wall 4 preferably provide a generally "L" shaped object. While FIG. 1 illustrates the primary wall 2 meeting the projecting wall at 90 degrees, it may be appreciated that the primary wall 2 may be set to intersect at an angle ☐ relative to the projecting wall that is less than 90 degrees, such as in the range of 30 to 80 degrees as illustrated in FIG. 2. As seen in FIG. 2, the primary wall 2 generally includes two sections, the bottom section 2b that is set at an angle relative to the projecting wall less than 90 degrees and the upper section 2a is set 90 degrees relative to the projecting wall 4. As illustrated, the at least one projection wall 4 adjoins to the primary wall 2 at the bottom edge 9 of the primary wall 2. However, it may be appreciated that alternatively the at least one projection 4 may adjoin the primary wall 2 at the bottom and proximal to, but spaced from, the from the bottom edge 9.

Figure 3:
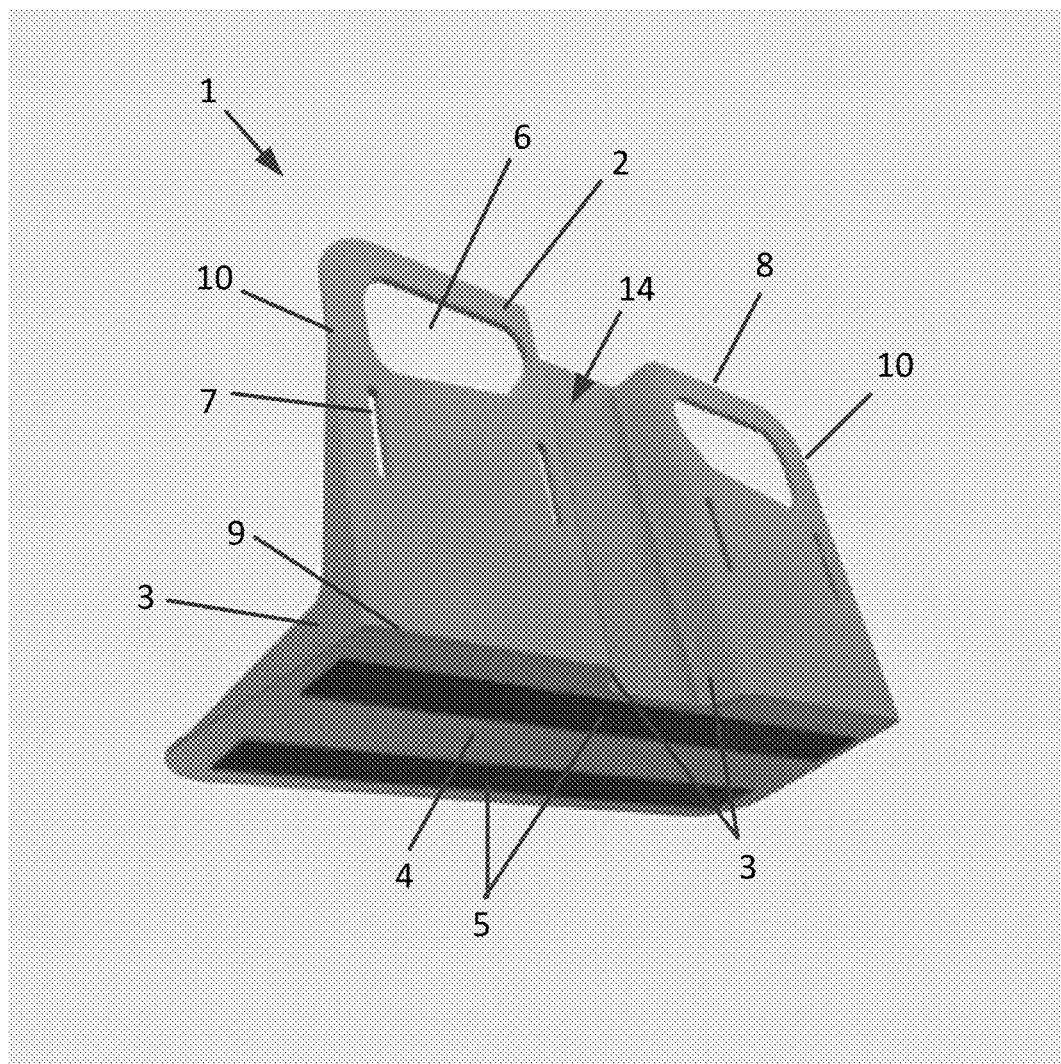
FIG. 3 illustrates yet a further embodiment of a cargo management device.
Figure 4:
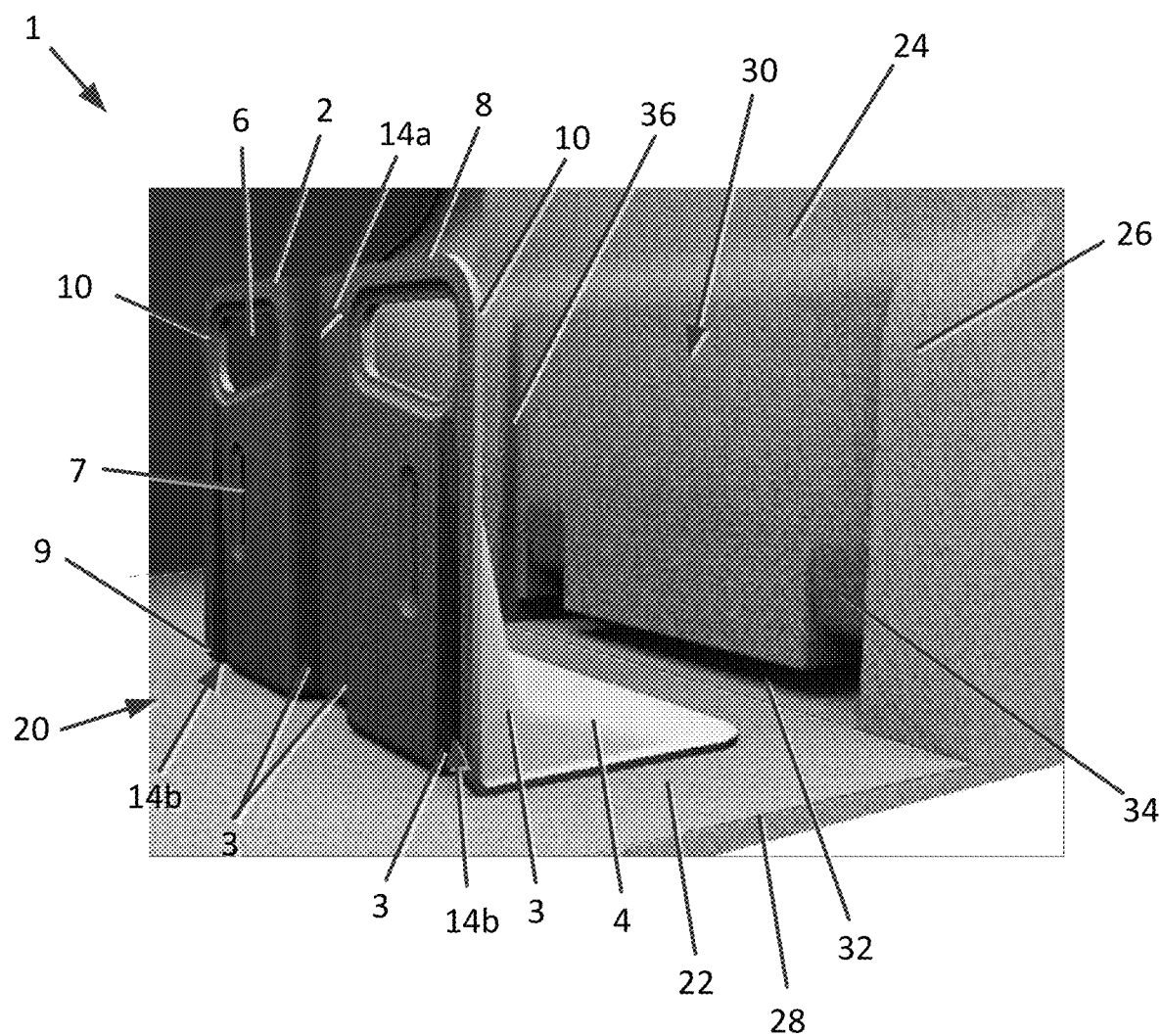
FIG. 4 illustrates yet another embodiment of a cargo management device deployed in the load floor area of a cargo compartment and a recess for the cargo management device integrated in the side wall trim panel.

As illustrated, the device also includes five ribs 3 extending between the primary wall 2 and ground wall 4; however, one or more ribs may be present, depending on the length of the device. The ribs may be molded with the primary and projecting walls, or secured to the primary and projecting walls. While the ribs are illustrated as being generally planar in FIG. 1, adjoining ribs may form a cavity 12 or channel 14 in the wall, as illustrated in FIGS. 2, 3 and 4. Channels 14 may extend along the entire wall height 14a or along a portion of the wall height 14b. If one was to consider the device as defining a volume V of space formed between the primary wall 2 and the projecting wall 4 (illustrated in FIG. 1), the channels 14 may extend outwardly from primary wall 2, expanding the volume, as illustrated in FIG. 2, or extend inwardly from the primary wall, reducing the volume, as illustrated in FIG. 4. Similarly, cavities 12 may extend into the projecting wall as illustrated in FIG. 2 or away from the projecting wall. The ribs may prevent torsion of the primary wall 2 relative to the projecting wall 4. The ribs may be positioned at the at side edges 10 and additionally, or alternatively, at one or more locations between the side edges 10.

In preferred embodiments, the device includes handles 6, which may be openings formed in the primary wall 2, which, as illustrated, are positioned proximal to the top edge 8 of the primary wall 2. However, handles may also be omitted and one may place a recess in the primary wall for hand gripping purposes. Further, in preferred embodiments, the device includes slots 7 for accessories, such as straps to secure items to the device. In preferred embodiments, the vertical, primary wall, exhibits a length more than twice its width.

The projecting wall 4 preferably includes an anchoring mechanism or component 5 for anchoring the device relative to the cargo compartment. As illustrated in FIG. 3, the anchoring mechanism 5 includes two strips, which may include mechanical fasteners, such as hook fasteners, loop fasteners or a combination of thereof, that interlock with carpeting or other fabric liner in the cargo area. The hook and loop fasteners may be available from VELCRO of Manchester, N.H. In addition, or alternatively, particularly where the cargo area is lined with a thermoplastic or metal liner, the anchoring mechanism 5 includes strips of relatively low durometer polymer materials, such as silicone or thermoplastic elastomer, that preferably exhibits a relatively higher coefficient of friction against cargo liner material than the coefficient of friction exhibited by the projecting wall on its own against cargo liner materials. The relatively low durometer materials are preferably materials with a durometer in the range of 60-85 Shore A.

It may also be appreciated that while two strips are illustrated in FIG. 3 extending parallel with the intersection of the bottom edge of the primary wall and the projecting wall, only one strip may be present or more than two strips may be present, such as up to ten strips. Further, the strips may extend perpendicular to the intersection of the bottom edge of the primary wall and the projecting wall.

In other embodiments, as illustrated in FIG. 2, the anchoring mechanism 5 includes one or more projections extending from the bottom surface of the projecting wall 4. The projections may include spikes extending from the surface that may engage the carpet or liner materials used in the cargo area. The spikes may assume pyramidal geometries, conical geometries or combinations thereof. In addition, the bottom surface of the projection wall 4 may include a nib design as disclosed in U.S. Publ. 2017/0190140, whose teachings are incorporated by reference. More specifically, the bottom surface of the projection wall may include a backing layer 108 (see FIG. 2A) having a surface and a plurality of nibs extending from the surface. The nibs are tiered, including a frusto-conical base extending from the surface of the backing layer and a tip extending from the frusto-conical base. The nibs also have a maximum diameter in the range of 0.5 to 3.0 mm and an overall height in the range of 1.5 mm to 5 mm. Each nib is located within a column and a row and is offset from at least one other nib present in the column and at least one other nib present in the row. In embodiments, the plurality of nibs form an array of nibs and the array is repeated on the backing layer. In preferred embodiments, an array includes 4 columns of nibs and 6 rows of nibs. Preferably, the nibs are present at a density of 2,000 to 150,000 nibs per square meter.

Also preferably, the backing layer, which can be attached to the projecting wall 4 of the cargo management device, such as through the use of an adhesive, to provide the preferred nib pattern, is preferably formed from a thermoplastic elastomer having an ash content in the range of 20 to 40% by weight, a melt flow index in the range of 60 grams per 10 minutes to 150 grams per 10 minutes measured at 190° C. and 21.6 kg, a tensile strength in the range of 3,000 kPa to 5,000 kPa, an elongation in the range of 450% to 700%, and a density in the range of 0.80 g/cm$^3$ to 1.33 g/cm$^3$. The backing layer may also be provided by thermoset elastomer (i.e. crosslinked) and may preferably be sourced from a diene rubber, such as cis-1,4-polyisoprene, or natural rubber. The thermoset elastomer may also be preferably sourced from styrene-butadiene rubber, otherwise known as SBR. Preferably, the thermoset elastomer may have a density in the range of 0.90 g/cm$^3$ to 1.70 g/cm$^3$. It should also be noted that the backing layer herein, whether sourced from thermoplastic elastomer and/or thermoset elastomer, may be used on its own and without the nib design noted herein. Accordingly, the surface of the thermoplastic and/or thermoset elastomer is contemplated to provide, on its own, frictional engagement with the surface of the vehicle where the cargo management may be utilized.

Figure 2A:
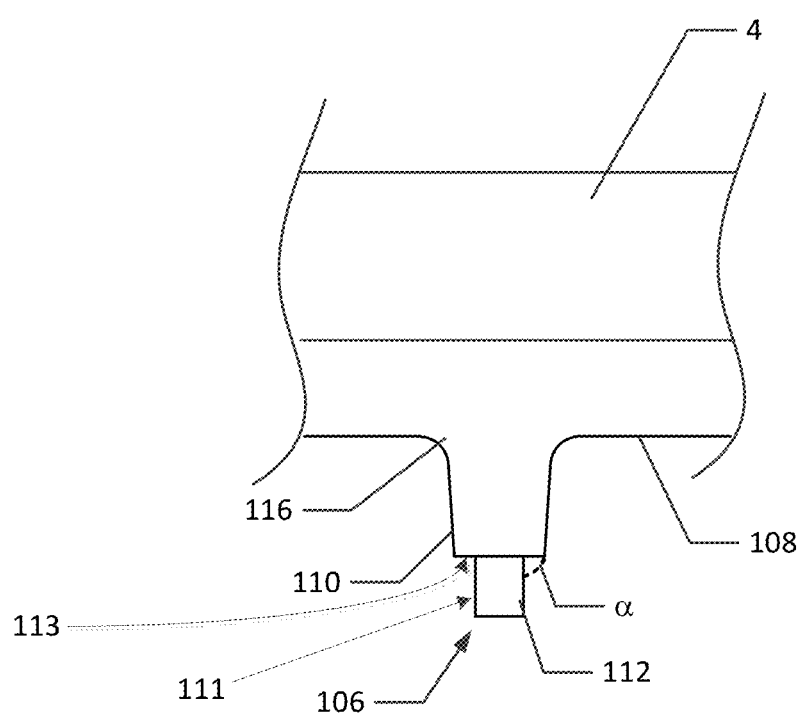
FIG. 2A illustrates a portion of the bottom surface of the projection wall of the cargo management device.

FIG. 2A illustrates an embodiment of a portion of the bottom surface of the projection wall 4 which can be used on any of the embodiments of the projecting wall disclosed herein. The nibs 106, which are also a projection, include a frusto-conical base 110 extending from the surface of layer 108 of the projection wall 4 and a tip 112 extending from the frusto-conical base. Accordingly it can also be observed from FIG. 2A that layer 108 can be attached to the projecting wall 4 which as alluded to above, includes the illustrated nib geometry. The frusto-conical base 110 preferably meets the layer 108 in a radius 116 around the perimeter of the base 110. The tip 112 is preferably cylindrical and is illustrated as such. However the tip may assume cross-sectional geometries other than circular, such as square, rectangular, ellipsoid, etc. Further, the distal portion of the tip (i.e. the portion distal from the base) may be flat, as illustrated, or rounded or pointed. As illustrated, and preferred, the sidewall of the tip 112 meets the upper surface of the frusto-conical base at an angle α of 90 degrees, however, angle α may be selected from an angle in the range of 45 to 135, including all values and ranges therein.

As may therefore be appreciated, each of the nibs is preferably tiered and the frusto-conical base has an upper surface 113 and a tip extending from the upper surface of the frusto-conical base wherein the tip includes a sidewall that meets the upper surface of the frusto-conical base where the tip has a diameter and the frusto-conical base has a diameter and the diameter of the tip is less than the diameter of the frusto-conical base.

The maximum diameter of the nibs 106 is preferably in the range of 0.5 to 3.0 mm, including all values and ranges therein, and the overall height of the nibs is preferably in the range of 1.5 mm to 5 mm, including all values and ranges therein. The higher of the tip 112 is preferably in the range of 10 percent to 50 percent of the total height of the nibs 106 and more preferably in the range of 25 percent to 35 percent of the total height of the nibs.

Figure 2B:
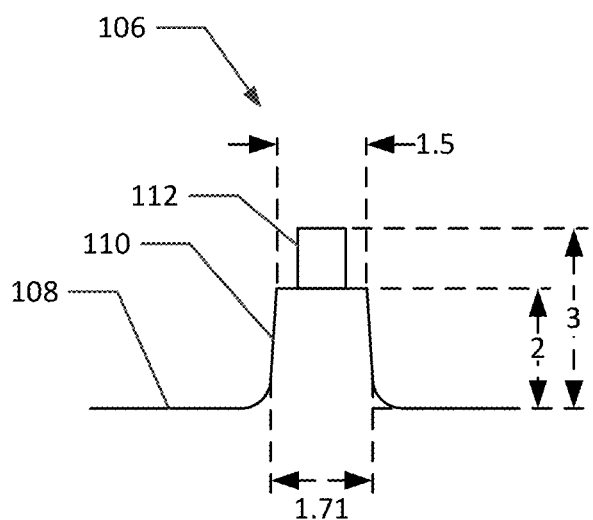
FIG. 2B illustrates further detail of the nibs having a frusto-conical base.

With attention directed to FIG. 2B, the bottom of the frusto-conical base 110 is preferably 1.71 mm in diameter and the top of the frusto-conical base is 1.5 mm in diameter. Further, the frusto-conical base 110 preferably extends 2 mm in height from the surface of layer 108 of the projection wall 4 and the entire nib extends 3 mm in height from the surface of layer 108 of the projection wall 4. Preferably, the density of the nibs is in the range of 2,000 nibs per square meter to 150,000 nibs per square meter, including all values and ranges therein, and more preferably 12,000 nibs per square meter.

Figure 2C:
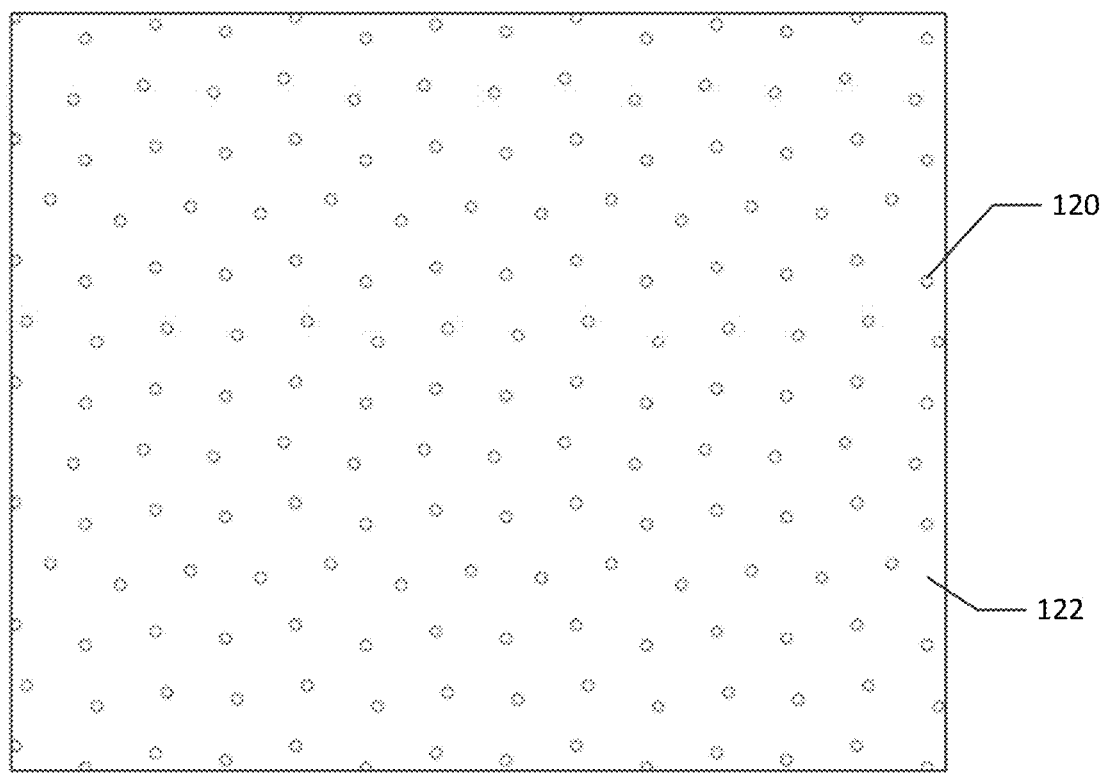
FIG. 2C provides one illustration of the nib patterns.
Figure 2D:
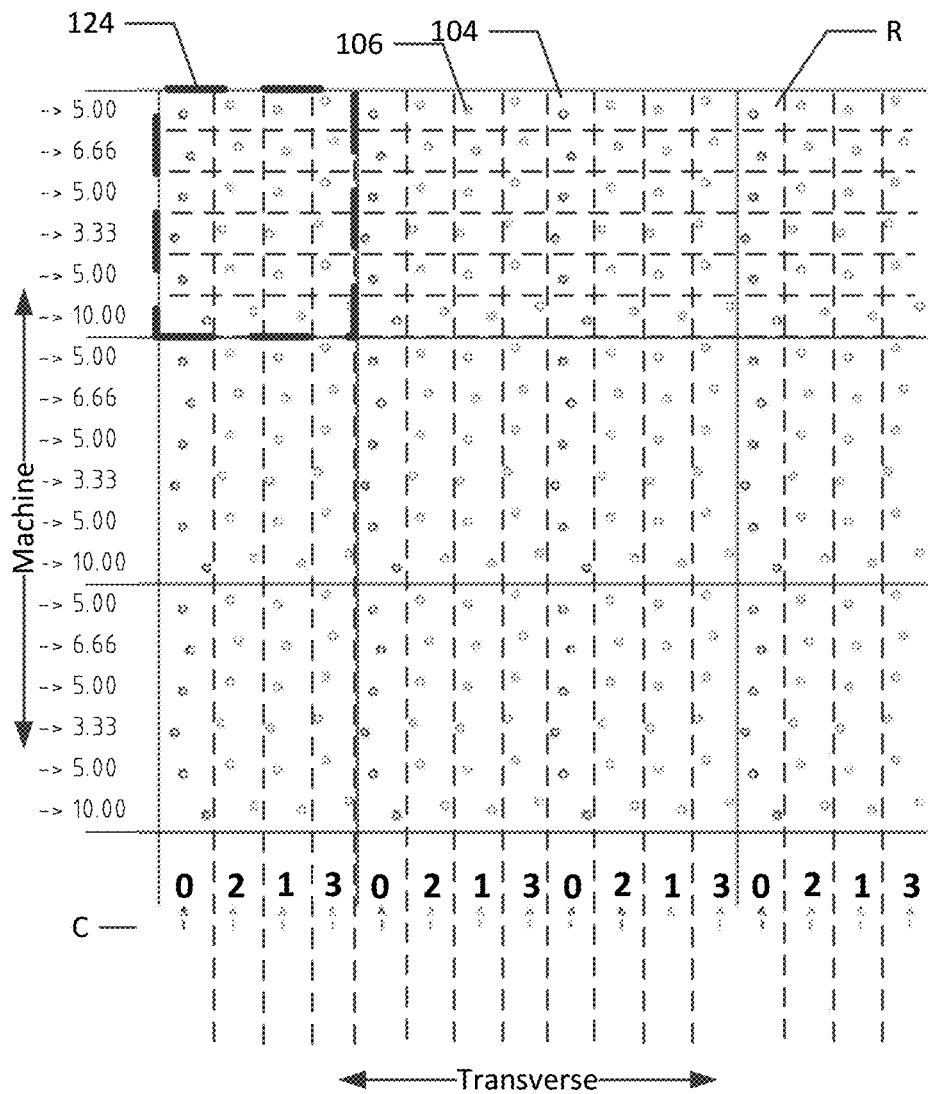
FIG. 2D provides another illustration of the nib patterns.

FIGS. 2C and 2D provide illustrations of a preferred nib pattern. The nibs form columns and rows, wherein the nibs then serve to define such a column and a row. The preferred randomized and repeating pattern 124 is preferably defined by four columns of nibs in the transverse direction and six rows of nibs in the machine direction, referred to here as a 4×6 array. However, the repeating randomized array may be in the range of 2 columns of nibs to 160 columns of nibs in the transverse direction by 2 rows of nibs to 180 rows of nibs in the machine direction, with a minimum size of 2 rows and 2 columns.

Accordingly, the repeating randomized array herein may be understood to preferably include 2 columns of nibs and 2 rows of nibs, containing a total of 4 nibs, where the 2 nibs defining the column are offset from one another proceeding downwardly in the column, and the two nibs defining the row are offset from one another proceeding across in the row of such array. In the preferred array configuration illustrated in FIG. 2D, the array 124 includes 4 columns of nibs, each column defined by 6 nibs (1 nib wide in the transverse direction by 6 nibs long in the machine direction). It also contains 6 rows of ribs, each row defined by 4 nibs (1 nib long in the machine direction by 4 nibs wide in the transverse direction), therein providing a total of 24 nibs. As can be seen in array 124, the nibs proceeding along the column are offset with respect to at least one other nib in the column and the nibs proceeding across the rows are similarly offset with respect to at least one other nib. More preferably, proceeding along the column or proceeding across the rows, each successive nib is offset with respect to a preceding nib.

Figure 2E:
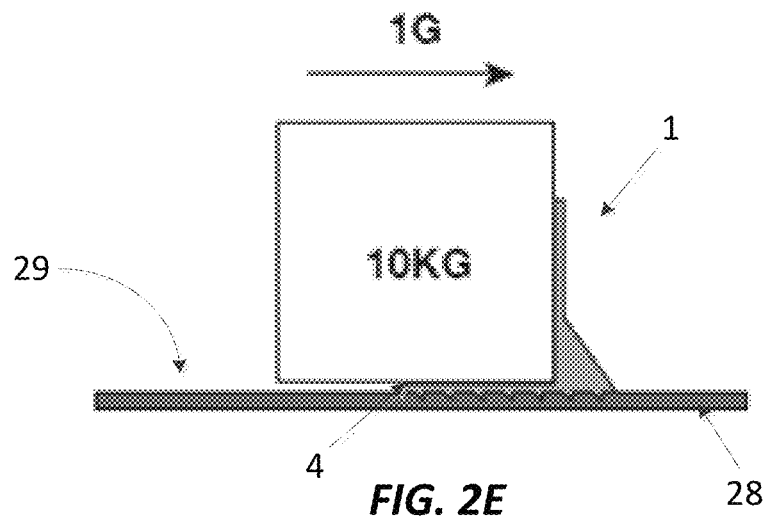
FIG. 2E illustrates the preferred level of frictional engagement of a projecting wall with an exposed surface.
Figure 2F:
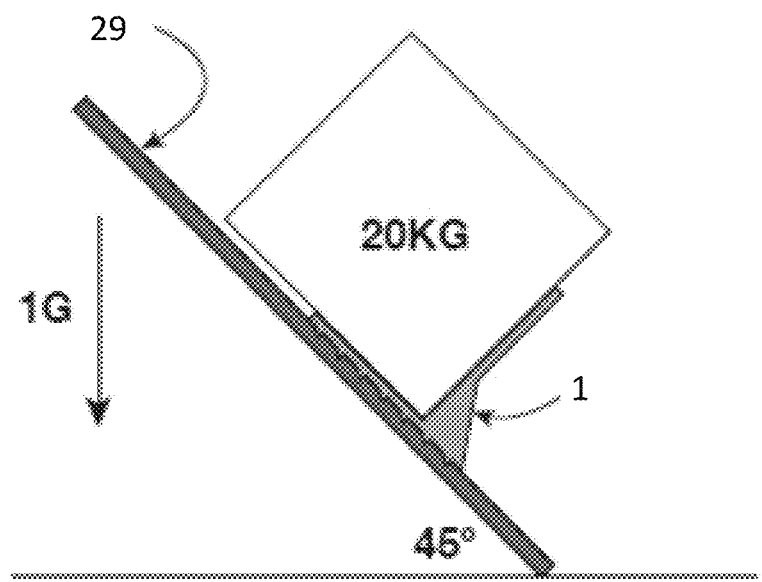
FIG. 2F illustrates a procedure where a 10 KG weight is disposed on a cargo management device to provide a 1 G load.

FIG. 2E illustrates the preferred level of frictional engagement of the projecting wall 4 with the exposed surface 29 of load floor 28. The exposed surface may therefore be a woven surface, non-woven surface, tufted carpet system, surface of a thermoplastic material, or the exposed surface of a thermoplastic elastomer or rubber (e.g. a thermoset elastomer such as a crosslinked diene elastomer). As illustrated in FIG. 2E, the projecting wall and its anchoring mechanism, which as noted above may include one or more projections, is such that it will preferably resist 10 KG (kilogram) of a shearing force acting on the cargo management device 1 under 1 G of acceleration. This can be conveniently evaluated by the procedure illustrated in FIG. 2F wherein a 20 KG weight is disposed on the cargo management device 1 which is then tilted at an angle of 45° to therefore provide a 1 G load. As shown in FIG. 2F the cargo management device herein is able to hold such a load, thereby confirming its ability to resist 10 kg of force under 1 G of acceleration.

In addition, the anchoring mechanism herein which as noted above may include one or more projections is such that it will meet or exceed static coefficient of friction requirements, as set forth in ASTM D1894-11, entitled Static and Kinetic Coefficients of Friction of Plastic Film and Sheeting, approved Sep. 1, 2011, published September 2011, in both vertical and horizontal directions, for both tufted and non-woven surfaces. More specifically, the one or more projections described herein is such that that static coefficient of friction as measured by ASTM D1894-11 noted above is in the range of 2.0 to 8.0, including all values and ranges therein, and particularly in the range of 4.0 to 8.0, relative to both tufted and non-woven surfaces.

FIG. 4 illustrates the device 1 in the deployed position within a cargo compartment 20. The cargo compartment includes a floor 22 and a side wall 24, which at least partially defines a load floor area 28. A load floor area 28, may be understood as the area on the floor 22, which supports cargo, the area being defined by the surfaces surrounding the floor, including e.g., one or more side walls, a gate or door, seats or other partition devices. The floor and side wall may be provided by a single trim panel or by multiple trim panels. The trim panels are formed into desired geometries before affixing the trim panels into the vehicle to provide a particular appearance or functionality when affixed in the vehicle. The trim panels may include at least one and often multiple layers of material, including an exposed surface that is visible when the panel is affixed in the vehicle. The exposed floor surface may be formed from woven or non-woven fabrics or sheets from one or more materials selected from, e.g., but not limited to polymeric materials including thermoplastics, thermoplastic elastomers or rubber. The exposed floor surface may also be formed from metal alloys, depending on the type of cargo compartment. In addition, the exposed side wall surface may be formed from woven or non-woven fabrics or sheets from a variety of materials polymeric materials including thermoplastics, thermoplastic elastomers or rubber. The exposed side wall surface may also be formed from metal alloys, depending on the type of cargo compartment. The exposed floor surface and exposed side wall surface may be formed from the same material or different materials.

Figure 5:
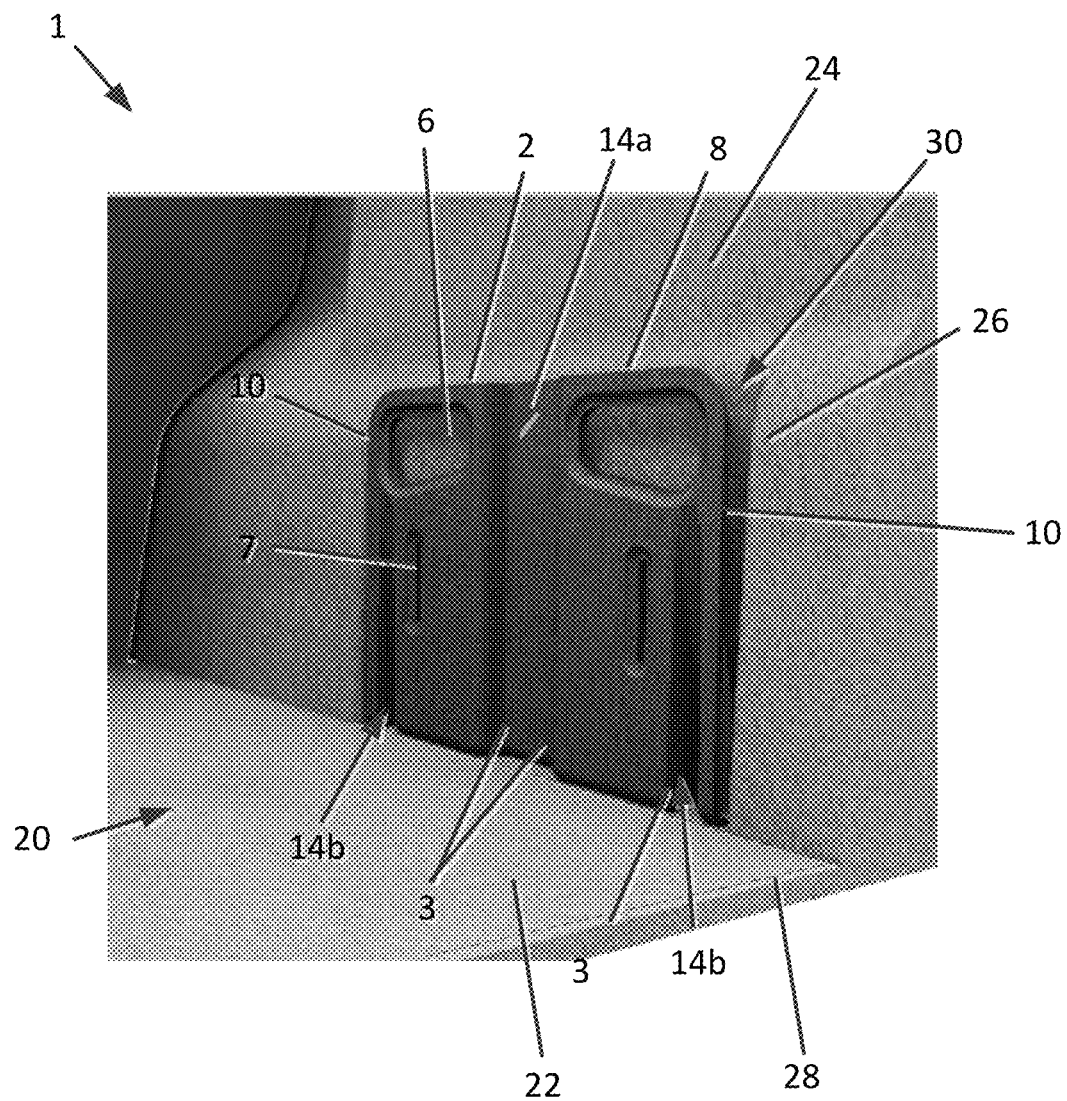
FIG. 5 illustrates the cargo management device positioned within the recess integrated in the side wall trim panel out of the load floor area.

Preferably, the side wall trim panel 24 includes a recess 30 that is complementary to the configuration of the cargo management device 1, wherein the geometry of the recess mirrors at least a portion of the geometry of the cargo management device 1. Reference to "mirrors" means that at least a portion of the geometry of the recess may fit within the recess of the trim panel. However, the cargo management device need not fit flush into such recess. The recess preferably includes a projecting recess 32 to accommodate the projecting wall 4. In addition, the recess 30 may include one or more rib recesses 34 for accommodating the ribs 3, including ribs that are formed into cavities and channels. The recess also preferably includes a depression in the side wall trim panel 36 that accommodates the thickness of the cargo management device 1 primary wall 2, such that the entire cargo management device, or at least a portion thereof, may sit within the recess flush to or depressed from the surrounding surfaces 26 of the side wall 24. The recess may be formed into just the side wall having the same materials as the surrounding surfaces 26, provided by both the floor surface 22 and the side wall 24, or provided by a secondary structure that is mechanically affixed to the side wall trim panel. The secondary structure may be formed from the same materials as the trim panel, or from other materials, such as the materials forming the floor panel. Further, the projecting recess 32 may include a surface which engages with the anchor mechanism, such as, for example, selected from the same surface as the exposed floor surface. In embodiments, the dimensions of the recess may provide an interference fit with at least a portion of the cargo management device, such as the projection wall or ribs, to snuggly retain the cargo management device. The recess may also include other mechanical attachment mechanism such as hooks or straps to immobilize and affix the cargo management device to the trim component. The recess 30 allows for storage of at least a portion of, and more preferably all of, the cargo management device 1 in the confines of the side trim panel and outside of the load floor area 28 as illustrated in FIG. 5.

Figure 6:
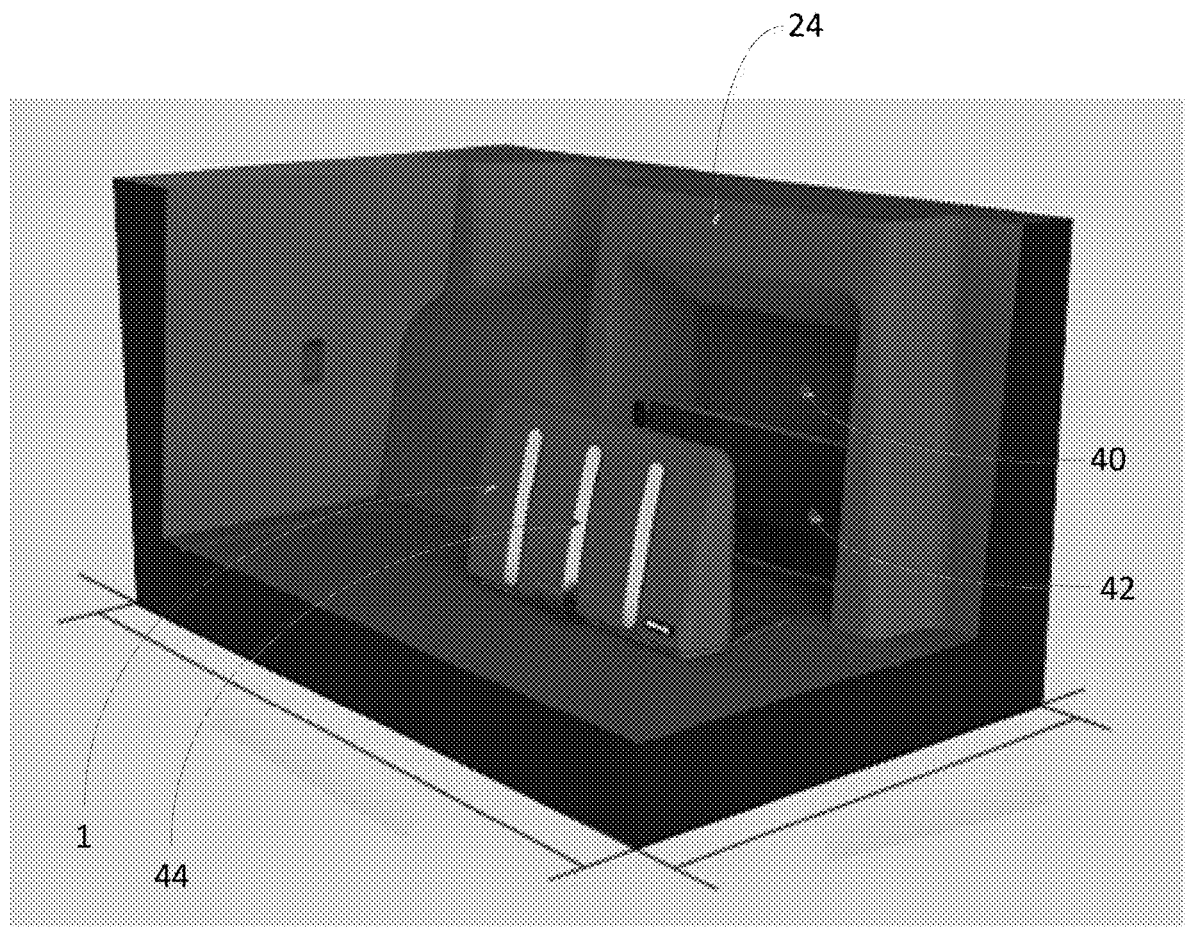
FIG. 6 illustrates another embodiment of the cargo management device herein.

FIG. 6 illustrates another embodiment herein. As illustrated, the free-standing cargo management device 1 may be configured to provide for cargo management within the trim panel 24 that now has a recessed region 40 that optionally may include a netting across all or a portion of the opening of the recessed region to assist further in cargo storage management. The primary wall 2 also may further include one or a plurality of reinforcing structures 44, discussed further herein, running along the length of the primary wall surface.

Figure 7:
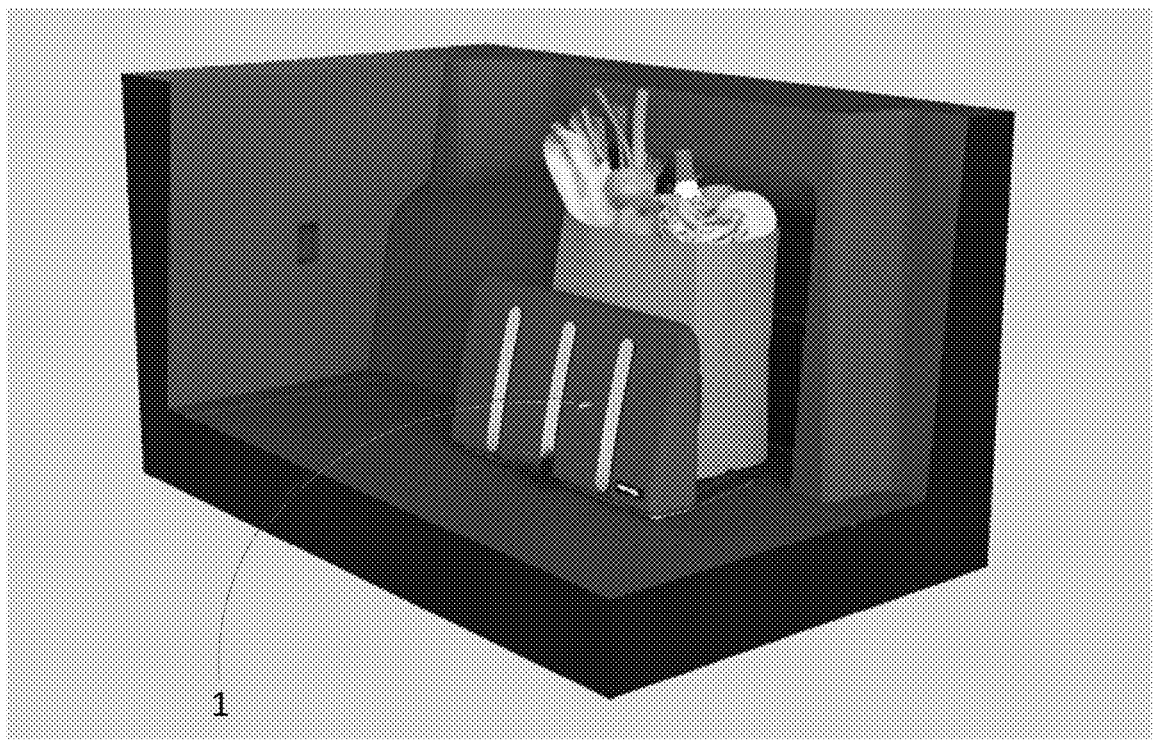
FIG. 7 illustrated how the free-standing cargo-management device operates with respect to an exemplary bag of consumer items.
Figure 8:
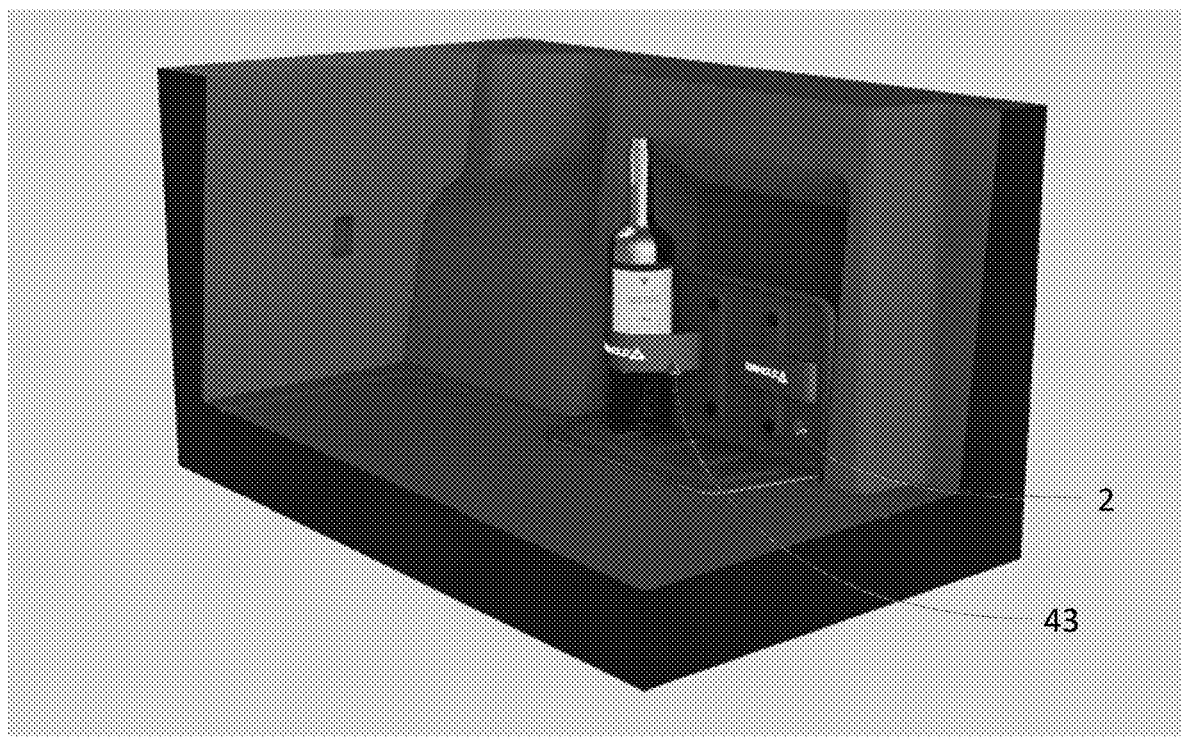
FIG. 8 illustrates the cargo management device herein optionally including strapping.

FIG. 7 illustrates how the free-standing cargo management device would operate with respect to an exemplary bag of consumer items. FIG. 8 illustrates that the cargo management device may also optionally include straps 43 to provide an additional method to immobilize consumer cargo (in this example, a bottle of wine or any other cargo that can be secured to the cargo management system via one or a plurality of straps 43). As seen, preferably, the straps 43 are configured such that they are secured to the primary wall 2 of the cargo management device 1.

Figure 9:
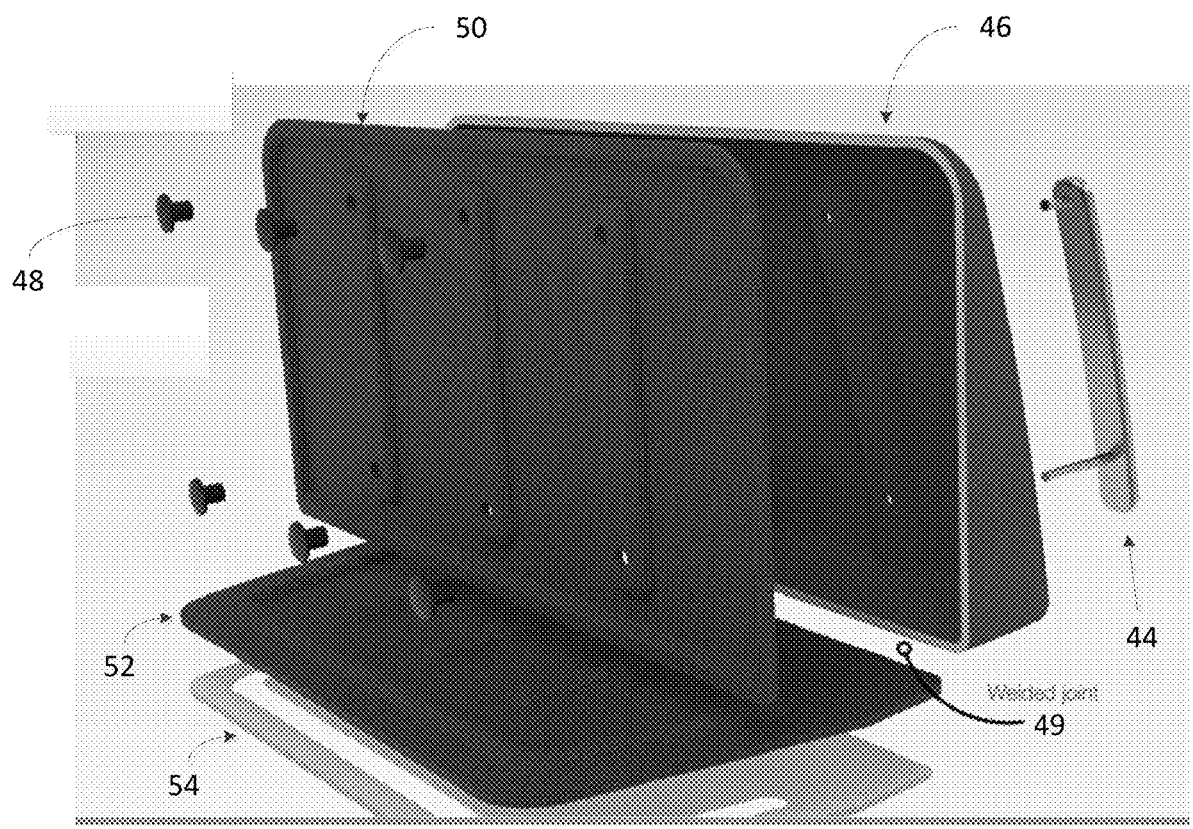
FIG. 9 illustrate a further preferred configuration for the free-standing cargo management device in component form.
Figure 10:
FIG. 10 illustrates the cargo management device of FIG. 9 in assembled form.

FIG. 9 illustrates a further preferred configuration for the free-standing cargo management device herein. As illustrated, it may include one or more reinforcing structures 44 that may include portions that extend through component 46 which can then be attached via one or a plurality of connectors 48 to wall section 50. In addition, component 46 may be preferably welded at 49 to the projecting wall 52. Also shown at 54 is a layer of material that may be attached to the bottom surface of projecting wall 52 to provide for a consistent ground plane and also to provide for gripping engagement with the floor of the vehicle, as described herein. FIG. 10 illustrates the cargo management device of FIG. 9 in the assembled configuration.

Figure 11:
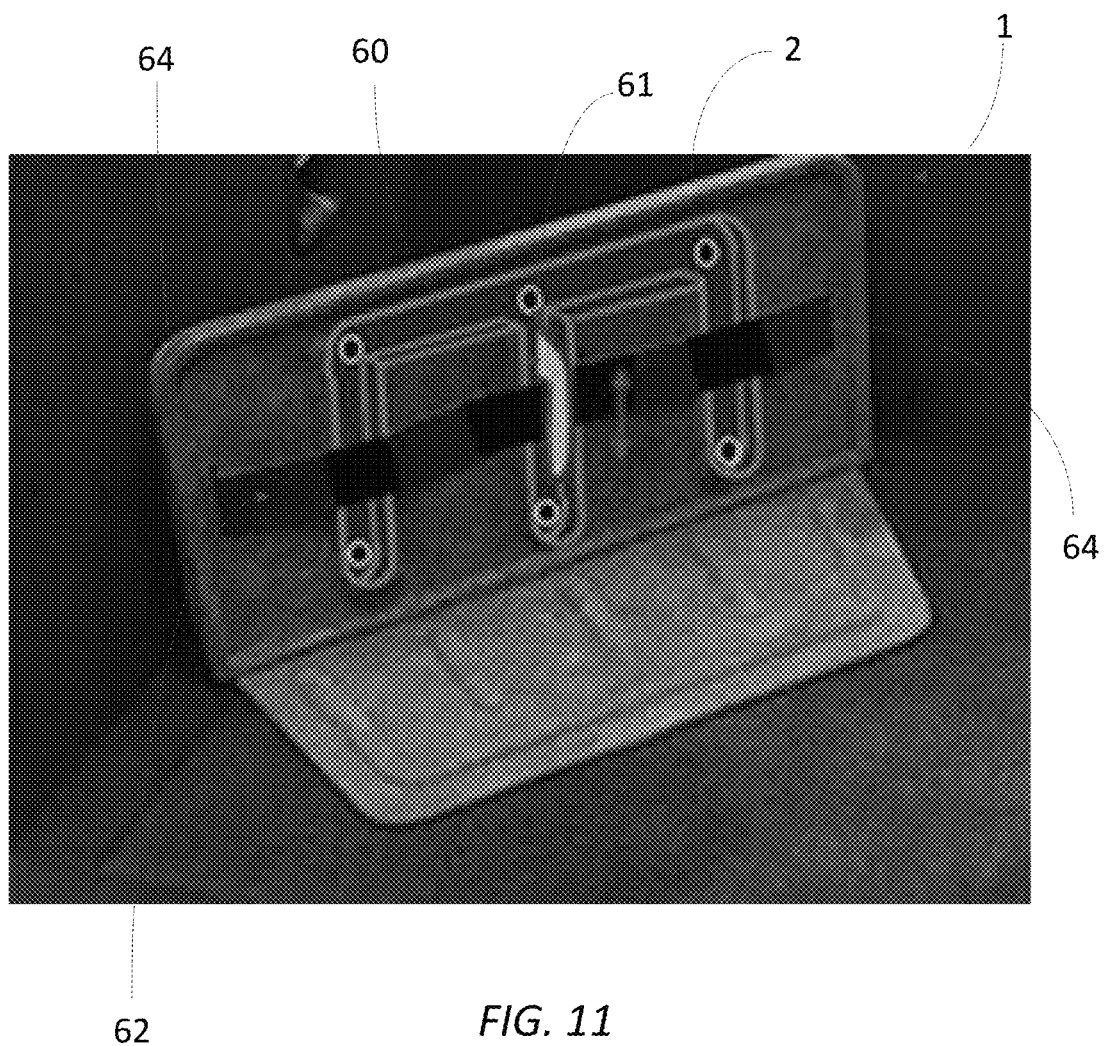
FIG. 11 illustrates another preferred configuration of the cargo management device herein including the use of a snap-in hook.
Figure 12:
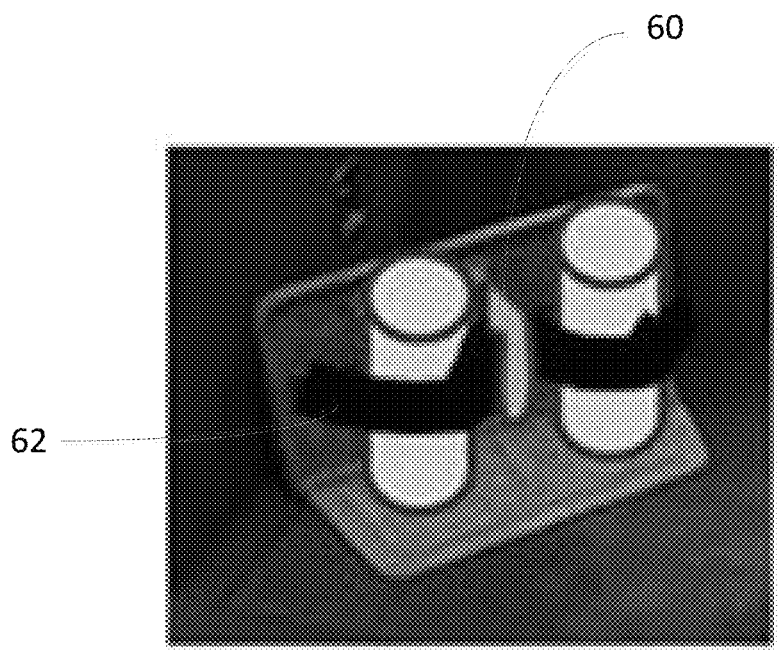
FIG. 12 illustrates the use of a snap-in hook to secure an elastic strap against the primary wall of the cargo management device.
Figure 13:
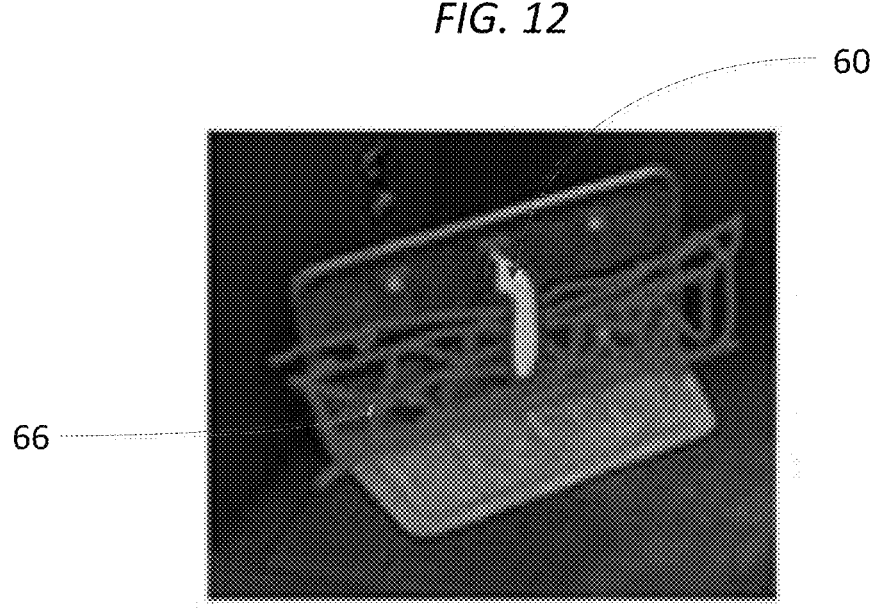
FIG. 13 illustrates the use of a snap in hook to secure netting to the primary wall of the cargo management device.
Figure 14:
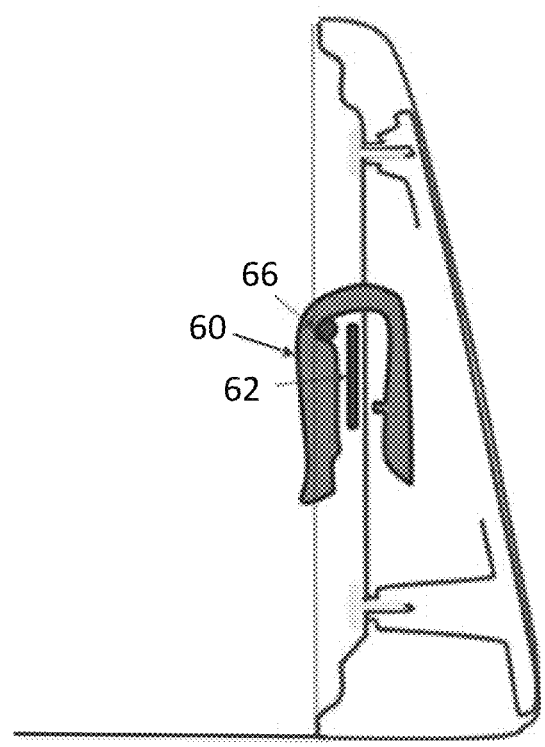
FIG. 14 provides a cross-sectional view of the cargo management device illustrating placement of the snap-in hook.

FIG. 11 illustrates another preferred configuration of the cargo management device 1 herein, which may include one or more snap-in hooks 60 projecting from a slot 61 in the primary wall 2. As illustrated in FIG. 12, the hook 60 may serve to tension and retain the elastic strap 62 more securely against the primary wall 2. The elastic strip 62 is also preferably attached to the primary wall 2 by passage through two slots 64, which are proximate the perimeter of primary wall 2, where the strap then can elastically contract around the primary wall 2. FIG. 12 illustrates the use of the hook 60 to secure the elastic strap 62 about the two identified objects to better hold such objects in place and FIG. 13 illustrates the use of the hook 60 to more securely attach the netting 66. FIG. 14 provides a cross-sectional view of the cargo management device illustrating how the hook 60 may engage and retain elastic strap 62 and/or a portion of the netting 66.

Figure 15:
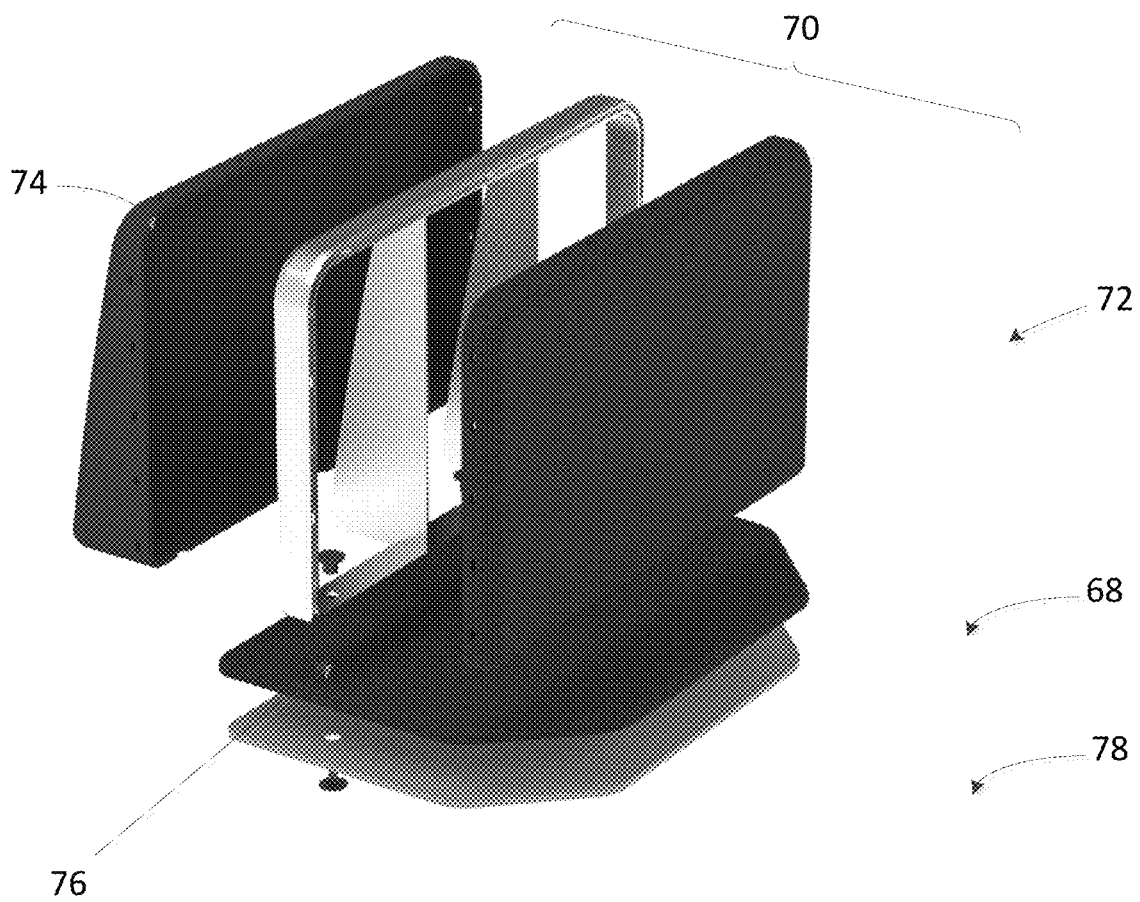
FIG. 15 provides an exploded view of another embodiment of the cargo-management device herein.
Figure 16:
FIG. 16 provides an assembled view of the cargo-management device of FIG. 15.

FIG. 15 provides an exploded view of another embodiment of the cargo management device herein. As can be seen, the cargo management device therein again includes a projecting wall 68 and primary wall 70, wherein the primary wall of multiple components. More specifically, the primary wall can be made from a relatively flat retainer wall 72, angled or contoured wall 74 which are configured to mechanically engage with retainer 76, which can include snap-in type engagement. The retainer may preferably be made of thermoplastic such as acrylonitrile-butadiene styrene (ABS) material or polycarbonate/ABS blends, provide for further support and relative strength. As previously noted, the cargo management device may then include an anchoring mechanism 78 that amounts to a relatively low durometer polymeric material, which as noted herein, preferably includes thermoplastic elastomer material with a durometer in the range of 60-85 Shore A. Attention is next directed to FIG. 16 which illustrated the cargo management system of FIG. 15 in the assembled configuration.

Figure 17:
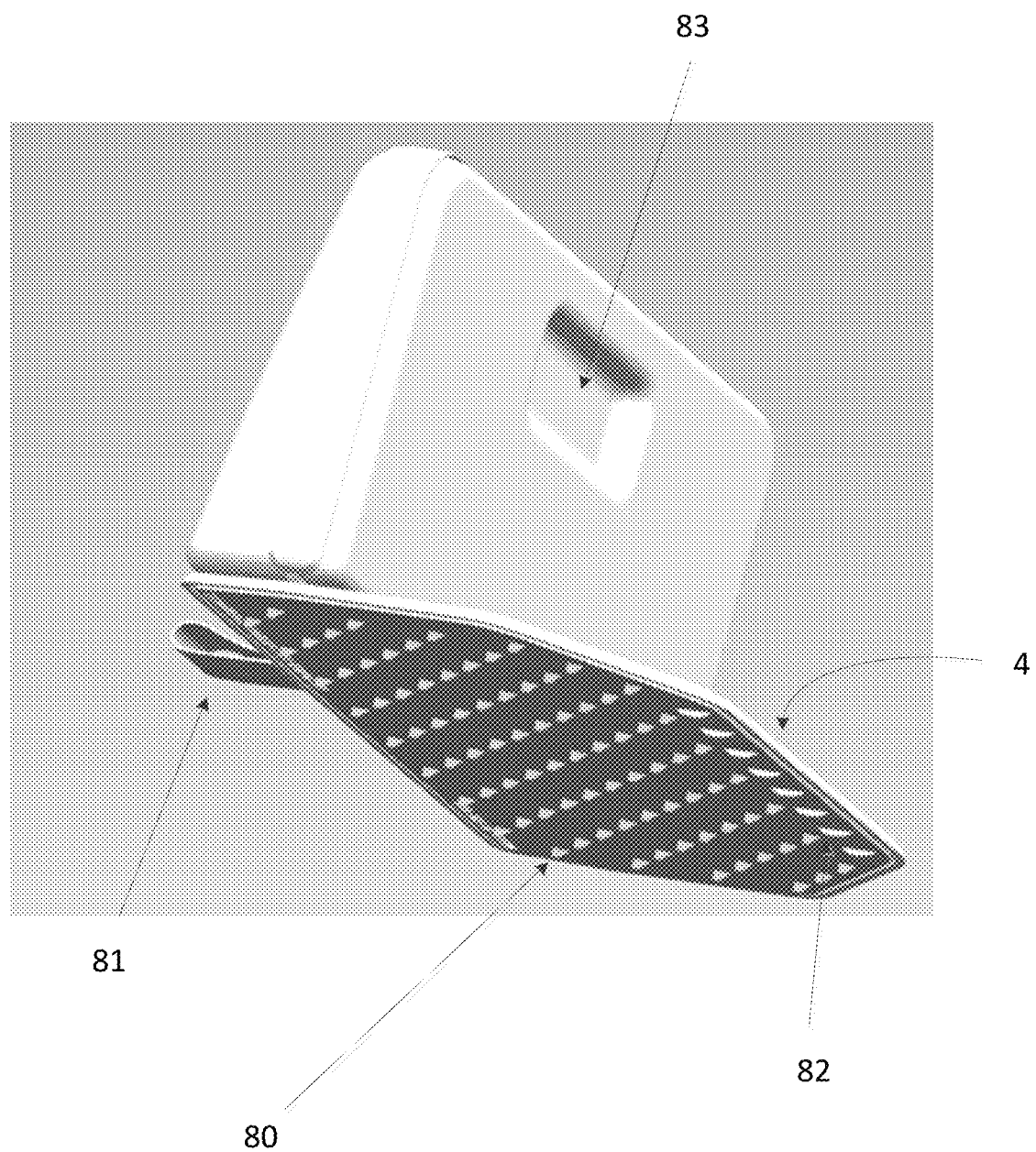
FIG. 17 provides a perspective view of another embodiment of the cargo management device herein.
Figure 18A:
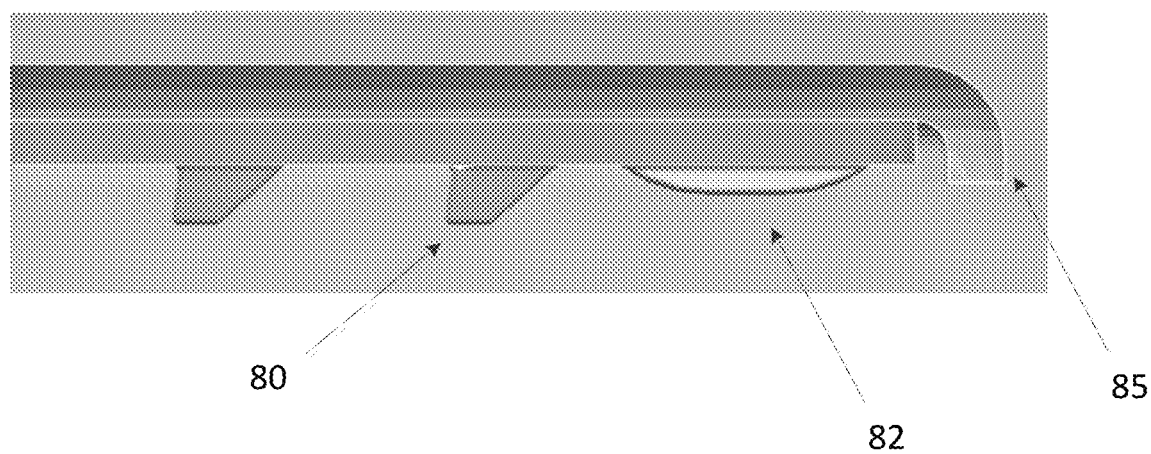
FIG. 18A provides a side view of the projections and slider ribs illustrated in FIG. 17.

FIG. 17 illustrates a perspective view of another embodiment of the cargo management device herein wherein the projecting wall 4 includes a plurality of protrusions 80 on its underside and what may be described as a plurality of slider ribs 82 positioned proximate to a front edge of the underside of the projection wall 4. Also shown is a handle 81 that facilitates the ability of the user to lift/tilt relocate the cargo management device in the vehicle or withdraw the device when it is inserted into a trim panel recess and to slide on the slider ribs. Also shown in a recess 83 for a user to rely upon to move/relocate the device. A side view of the projections 80 and slider ribs 82 are next shown in FIG. 18A. The slider ribs, as noted, are preferably positioned proximate to the front edge 85 of the projecting wall, and in preferred embodiment, a leading end portion 86 of the slider ribs are within 0.1 to 0.5 inches from the front edge of the projecting wall.

Figure 18B:
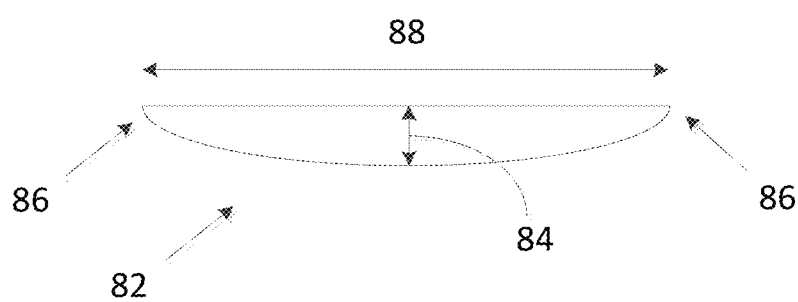
FIG. 18B provides a further side view of the slider ribs illustrated in FIG. 17.

As can be seen in a further side view of the slider ribs 82 in FIG. 18B, the slider ribs preferably have a maximum height in the range of 2.0 mm to 3.0 mm, as indicated at 84, which then tapers and slopes towards each respective end portions 86. The slider ribs preferably have a length 88 of 10 mm to 20 mm, more preferably 14.0 mm to 16.0 mm, and in a most preferred embodiment, a length of 15.0 mm. The slider ribs also preferably have a width of 2.0 mm to 3.0 mm.

Figure 19:
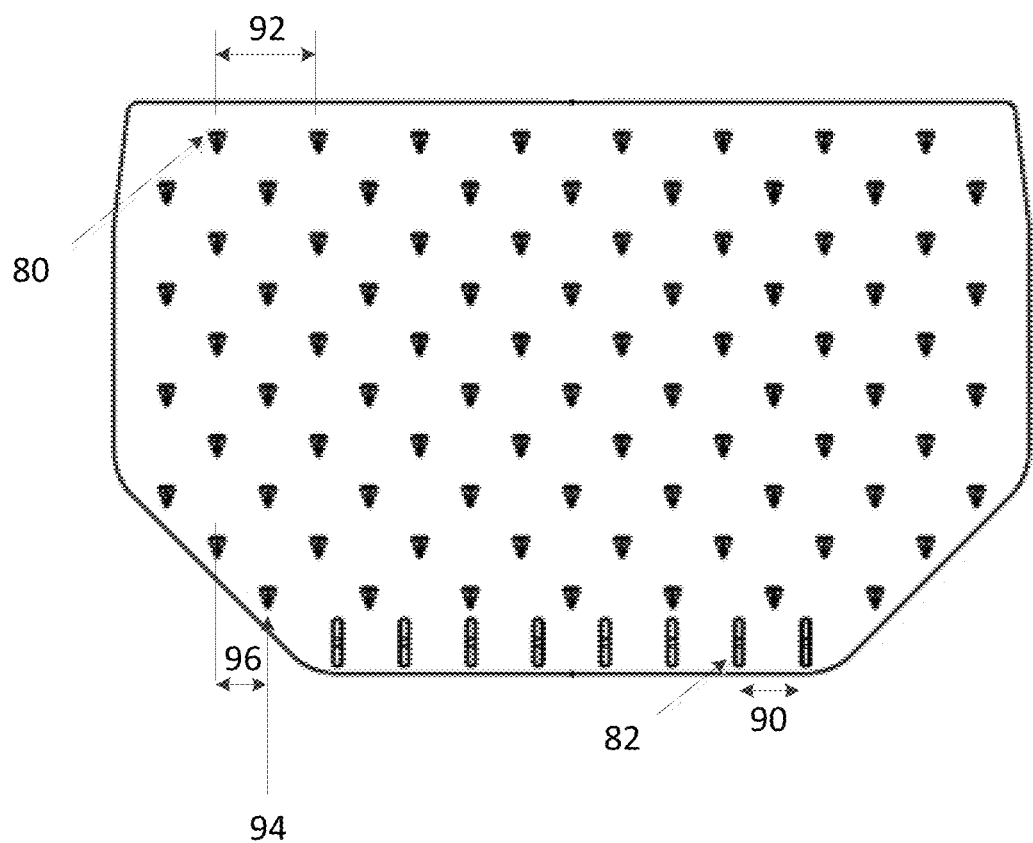
FIG. 19 is a view of the underside of the projection wall illustrating the projections and slider ribs.

As illustrated in FIG. 19, the slider ribs 82 may be spaced from one another a distance 90 in the range of 15.0 mm to 25.0 mm, more preferably 18.0 mm to 22.0 mm, and in a most preferred embodiment, a spacing of 20.0 mm at +/−1.0 mm. In addition, the projections 80 are preferably arranged in parallel rows that are spaced apart as shown at 92 in an amount of 30.0 mm to 40.0 mm, more preferably 34.0 mm to 38.0 mm, and in a most preferred configuration, 36.0 mm. The projections include an offset vertical row 94 (i.e. the projections in each respective row are not aligned horizontally) which is offset by a distance shown at 96 from an adjacent row in the amount of 15.0 mm to 20.0 mm, more preferably 17.0 mm to 19.0 mm, and more preferably at 18.0 at +/−1.0 mm.

Figure 20:
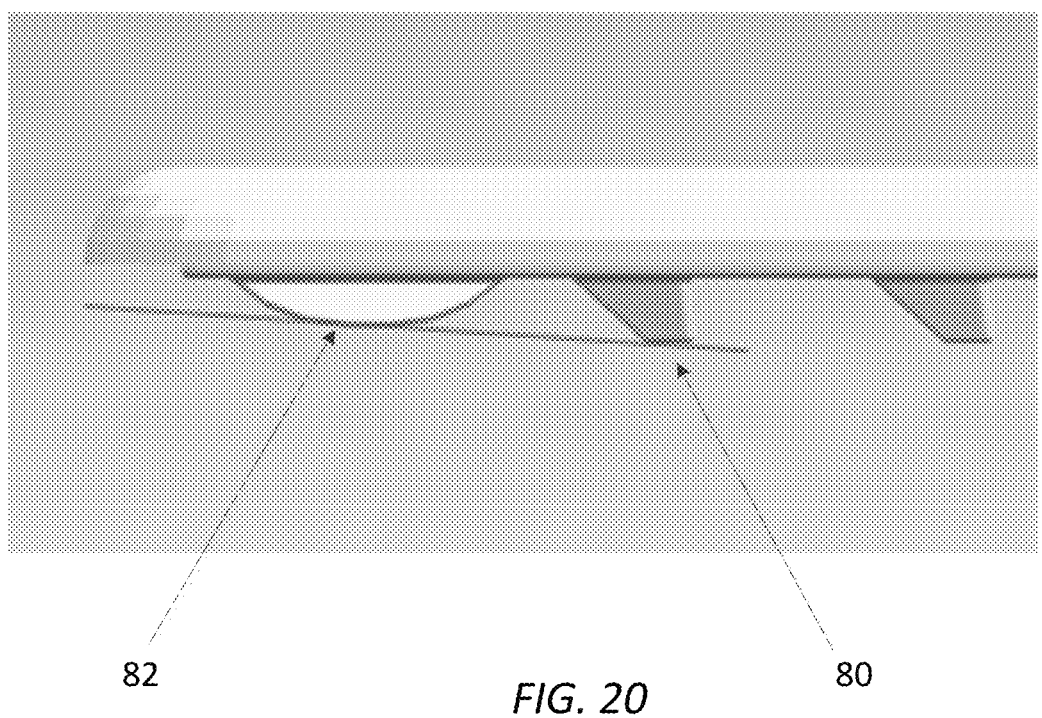
FIG. 20 is a side view of the underside of the projection wall illustrating the slider ribs and projections.

A further side view of a portion of the projections 80 and slider ribs 82 is shown in FIG. 20. As may be appreciated, due to the placement of the slider ribs at the edge of the projection wall, as shown therein and with reference to FIG. 19, the slider ribs allow one to lift the cargo management device to an angle of about 4-5° from its planar position on the floor of the vehicle to release the engagement of the projections 80 so that the cargo management device can be conveniently repositioned.

Figure 21A:
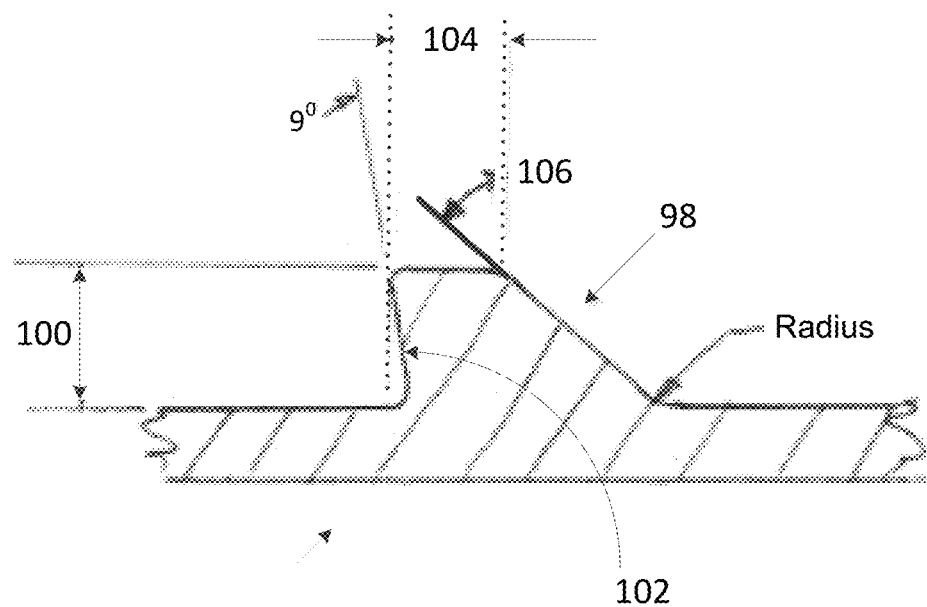
FIG. 21A is a side view of the projections.
Figure 21B:
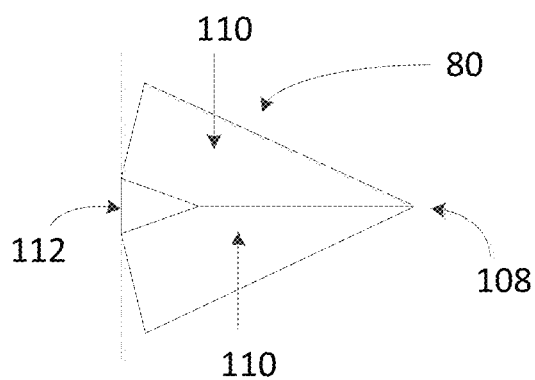
FIG. 21B is a top view of the projections.

With regard to the geometry of the projections 80, a side view is provided in FIG. 21A. As can be seen, the projection 80 has a first sloping wall portion 98 that is defined by a Radius from the planar portion of the projecting wall of 0.4 mm to 0.6 mm, more preferably 0.5 mm. The projections project at 100 a distance of 3.0 to 4.0 mm. The projections include a second wall portion at 102 that in preferred embodiment, as illustrated, is undercut 9° relative to the planar portion of the projection wall. However, it should be appreciated that such undercut may range from 4° to 14°. The length of dimension 104 is preferably in the range of 2.0 mm to 3.0 mm. As can also be seen, the sloping wall 98 may define an angle at 106 of 45° to 55°, more preferably 48° to 50°. A top view of the projections 80 are shown in FIG. 21B. As can be seen the top of the projections define a generally triangular in shape as defined by point location 108 and two angled rear wall portions 110. From the top of the projection to the base of the projection, the two walls 110 are preferably downwardly and outwardly sloped at an angle of 15° to 25°, more preferably 18° to 22°, and in a most preferred configurated, at 20°+/−1°.

The foregoing description of several methods and embodiments has been presented for purposes of illustration. It is not intended to be exhaustive or to limit the claims to the precise steps and/or forms disclosed, and obviously many modifications and variations are possible in light of the above teaching.

The invention claimed is:

1. A freestanding unit for securing items within a floor of a cargo area in a vehicle comprising:
   a primary wall and at least one projecting wall extending from said primary wall wherein said projecting wall includes an anchoring component for anchoring said freestanding unit to said floor in said cargo area;
   said anchoring component comprising a plurality of protrusions;
   a plurality of slider ribs on said projecting wall; and
   wherein said protrusions have a length of 2.0 mm to 3.0 mm as between a first sloping wall portion defined by a Radius from a planar portion of said projecting wall of 0.4 mm to 0.6 mm and a second wall portion that is undercut at an angle of 4° to 14°, including two wall portions downwardly extending from a top of said projection to a base of said projection at an angle of 15° to 25°.

2. The freestanding unit of claim 1 wherein said at least one projecting wall includes a front edge and said slider ribs are 0.1 to 0.5 inches from the front edge of said at least one projecting wall.

3. The freestanding unit of claim 1 wherein each of said plurality of slider ribs are spaced from each other a distance in a range of 15 mm to 25.0 mm.

4. The freestanding unit of claim 1 wherein each of said plurality of slider ribs are spaced apart from each other a distance of 20.0 mm±1.0 mm.

5. The freestanding unit of claim 1 wherein said protrusions are arranged in parallel rows.

6. The freestanding unit of claim 5 wherein said parallel rows of protrusions are spaced apart from each other in an amount of 30.0 mm to 40.0 mm.

7. The freestanding unit of claim 1 wherein said protrusions project a distance of 3.0 mm to 4.0 mm from said at least one projecting wall.

8. The freestanding unit of claim 1 wherein said first sloping wall extends from said at least one projecting wall at an angle of 45° to 55°.

9. The freestanding unit of claim 1 wherein said protrusions include a generally triangular shape.

10. The freestanding unit of claim 1 further including one or more straps secured to said primary wall, wherein said straps are configured to immobilize consumer cargo.

11. The freestanding unit of claim 1 wherein said primary wall includes one or more slots and further including one or more snap-in hooks wherein said snap-in hooks are configured to retain a strap against said primary wall.

* * * * *